May 19, 1925.
A. M. HAANSTAD
DIRIGIBLE HEADLIGHT
Filed Sept. 21, 1923
1,538,548
2 Sheets-Sheet 1
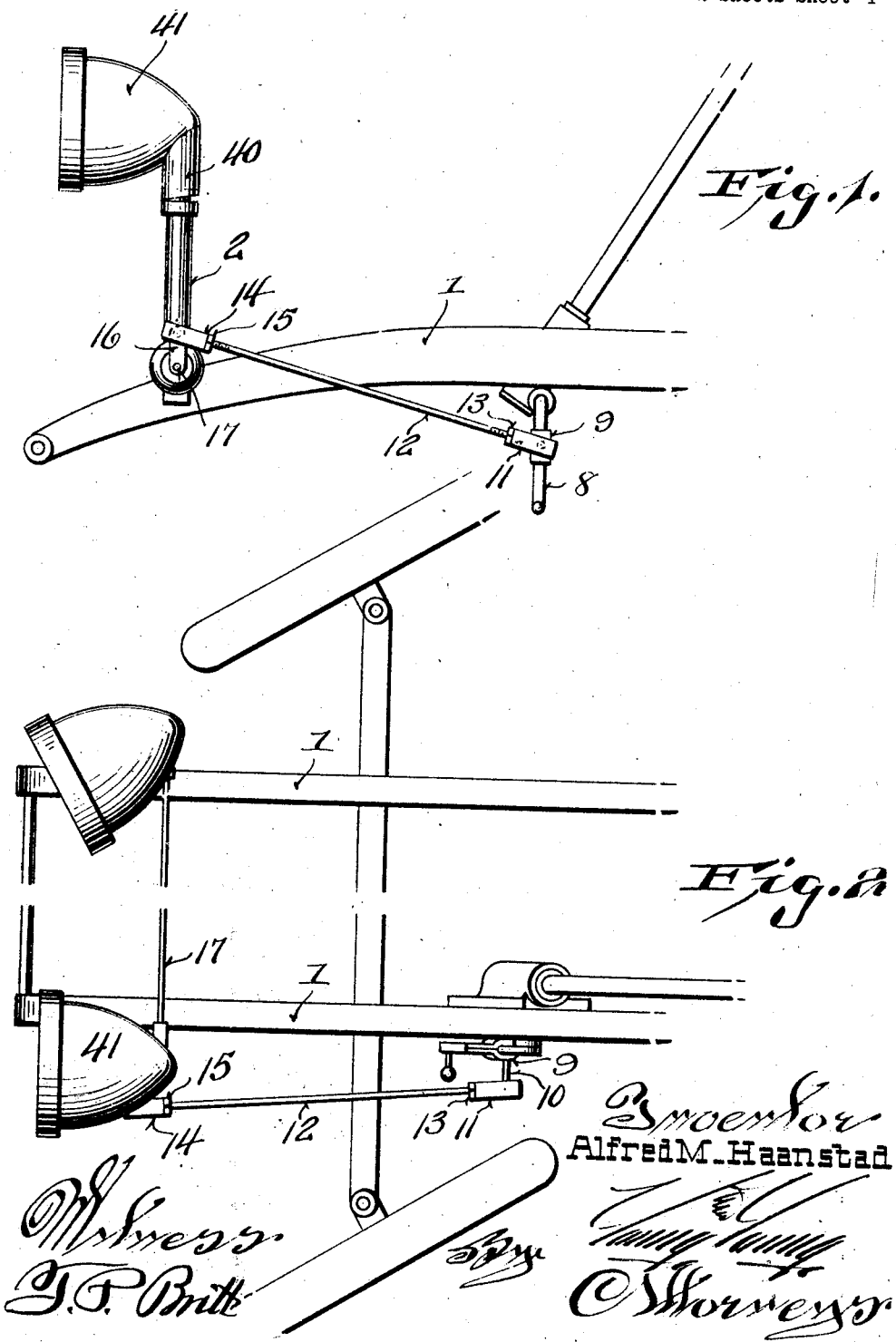

May 19, 1925.  1,538,548
A. M. HAANSTAD
DIRIGIBLE HEADLIGHT
Filed Sept. 21, 1923   2 Sheets-Sheet 2
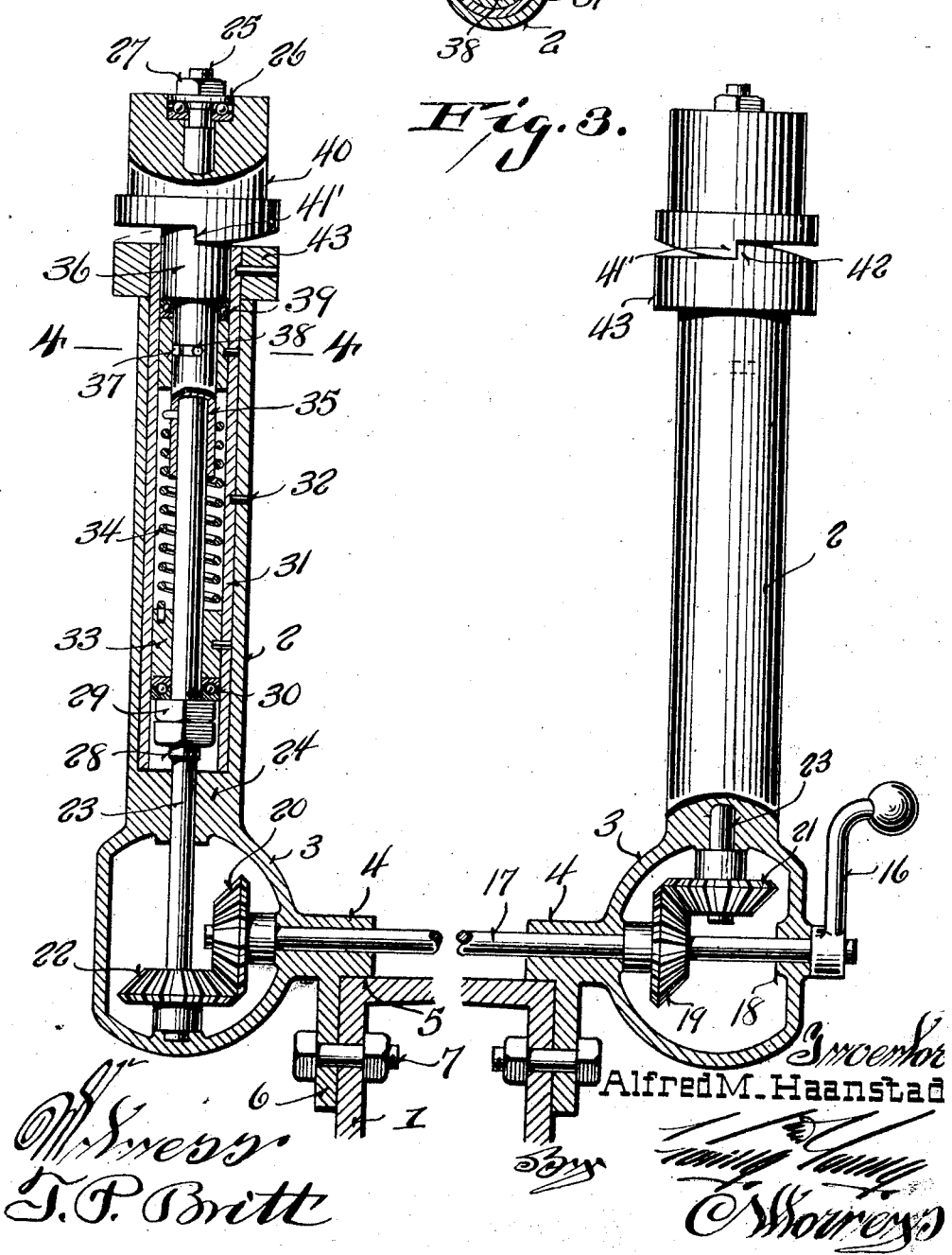

Patented May 19, 1925.

1,538,548

UNITED STATES PATENT OFFICE.

ALFRED M. HAANSTAD, OF EAU CLAIRE, WISCONSIN.

DIRIGIBLE HEADLIGHT.

Application filed September 21, 1923. Serial No. 663,995.

*To all whom it may concern:*

Be it known that I, ALFRED M. HAANSTAD, a citizen of the United States, and resident of Eau Claire, in the county of Eau Claire and State of Wisconsin, have invented certain new and useful Improvements in Dirigible Headlights; and I do hereby declare that the following is a full, clear, and exact description thereof.

This invention relates to dirigible headlights, for automobiles and is an improvement over that disclosed in my copending application for dirigible headlights, Serial Number 597,877, filed October 30, 1922, and in general has the same objects as those enumerated in such application.

Further objects are to provide a dirigible headlight for automobiles which may be connected with the steering mechanism without requiring any alteration in such mechanism, which may be readily adjusted to vary the throw or rotation of the headlights, which will turn only one headlight at a time when a turn is made, which is provided with adequately housed and protected operating mechanism, and which presents an attractive and pleasing appearance.

An embodiment of the invention is shown in the accompanying drawing, in which:—

Figure 1 is a fragmentary side elevation of an automobile with the dirigible headlights and the operating mechanism in position, certain portions of the automobile being omitted for the sake of clearness.

Figure 2 is a plan view of the structure shown in Figure 1.

Figure 3 is an enlarged sectional view showing the operating mechanism for the headlights.

Figure 4 is a sectional view on the line 4—4 of Figure 3.

Upon the side bars 1 of the automobile, a pair of vertical sleeves 2 are mounted adjacent the front of the machine in approximately the position normally occupied by the headlight. These sleeves terminate in enlarged somewhat spherical lower casings 3, which are provided with bearings 4 having lower flattened faces 5, and having downwardly projecting lugs 6 which are bolted to the side frames 1, as indicated at 7. The steering rock-arm 8 is utilized to operate the lights, and a bracket 9 is adjustably clamped about such arm and is provided with a laterally projecting pin 10 which has a ball and socket joint with the block 11. This block 11 has threaded thereinto a rod 12, such rod being provided with a lock nut 13 so that it may be securely held in position, after the desired adjustment has been obtained. The other end of this rod is threaded into a corresponding block 14 and is similarly provided with a lock nut 15. The forward block 14 is joined by a ball and socket connection with a crank arm 16 rigidly secured upon a transverse shaft 17.

The transverse shaft 17, as shown in Figure 3, is carried in the bearings 4, previously described, and projects at one end through a bearing 18 formed in the casing 3 of one of the sleeves 2. This transverse shaft is provided with a beveled gear 19 intermediate its ends and with a second beveled gear 20 at the end opposite the crank arm 16. The bevel gears 19 and 20 mesh respectively with the bevel gears 21 and 22 rigidly secured upon the vertical shafts 23 which extend upwardly through the sleeves 2. Inasmuch as the mechanism contained in the sleeves 2 are the same except for the loose joint, or loose or lost motion connection, one only of such mechanisms need be described, for instance, the right hand one shown in Figure 3. It will be seen that the shaft 23 is carried in a bearing 24 formed in the lower end of the sleeve 2 and that such shaft projects completely through such sleeve and terminates in an upper reduced threaded extension 25. A ball bearing 26 is carried by the reduced extension and is held in place by a nut 27. At an intermediate point upon the shaft adjacent the bearing 24 an enlarged threaded portion 28 is provided and carries nuts 29 which, when the desired adjustment is secured, are firmly locked upon said shaft. These nuts bear against the under side of a ball bearing 30 and thus hold the shaft against upward motion while freely permitting rotary motion thereof. An inner sleeve 31 is locked within the main sleeve 2 and is secured thereto in any suitable manner, as by means of a pin 32. This inner sleeve has pinned thereto a block 33 within which the lower end of a helical spring 34 is secured. The upper end of this helical spring is secured within the reduced extension 35 of a hub 36. This hub and reduced extension are loosely mounted upon the spindle or shaft 23 and are urged by means of the spring 34 in a direction to rock the hub in a clockwise manner when the observer looks downwardly upon such hub. This reduced extension is provided with a slot 37 within which a pin 38 carried by the shaft 23 is free to slide, such pin being held in contact with the end of the slot by means of the spring 34. The hub 36, it will be seen rests upon a roller bearing 39 and thus affords a substantially frictionless support for the hub. The hub 36 is integrally joined to an enlarged portion 40 which, as may be seen from Figure 1, forms the support for the headlight 41, such headlight being rigidly secured thereto. The portion 40 is provided with a shoulder 41', which is adapted to contact, under normal conditions, with a corresponding shoulder 42 formed upon a collar 43 rigidly secured to the inner sleeve 31.

It is to be noted that the right and left hand lights are provided with stops 41 and 42 arranged in a reverse manner so as to prevent moving of the light outwardly. Obviously, however, the mechanism might be so designed as to permit outward motion of the lights while preventing inward motion thereof.

The operation of the apparatus is as follows: When the automobile is operated to effect a turn, the steering rock-arm 8 is correspondingly moved and motion is imparted to the dirigible light mechanism by means of the link 12 (see Figure 1). This link rocks the arm 16 and consequently turns the shaft 17 which, through the medium or the beveled gears, imparts corresponding motion to the vertical shafts 23. Assume, for instance, that a left hand turn is made, as shown in Figure 2, under these conditions the right hand vertical shaft will be turned in a clockwise direction and a pin 38 engaging the end of the slot 37 will rock the member 40 and consequently the headlight 41 against the action of the spring 34 into the position shown in Figure 2. When the automobile is again straightened out, the spring 34 will restore the headlight 41 until the stops 41' and 42 prevent further motion. If the automobile is turned in the reversed direction, the corresponding slot 37 of the other headlight will be engaged by the corresponding pin 38 and such headlight will then be rocked to the right.

It will be seen, therefore, that a dirigible headlight mechanism has been provided in which the use of mutilated gears or other complicated mechanism is avoided and instead a sturdy substantial and rugged construction is produced.

Although one form of the invention has been described in considerable detail, it is to be understood that the invention may be variously embodied and is, therefore, to be limited only as claimed.

I claim:

The combination of an automobile having a steering post, a pair of sleeves rigidly carried adjacent the front of said automobile, a vertical shaft located within each sleeve and extending beyond the ends of such sleeves, a transverse shaft located below said first mentioned shafts, bevel gears positively connecting said first mentioned shafts and said horizontal shafts, mechanism positively connecting said horizontal shaft and said steering post to transmit rotary motion from said steering post to said horizontal shaft, headlights having hub portions through which said shafts loosely extend, said sleeves and hubs having interengaging lugs adapted to prevent rotation of said hubs except in predetermined directions, said shafts having pins projecting radially therefrom, said hubs having slots within which said pins are received, and helical springs carried within said sleeves and rigidly attached at one end to such sleeves and at the other end to said hubs to yieldingly hold said hubs with the interengaging lugs of the respective sleeves and hubs in contact under normal conditions.

In testimony that I claim the foregoing I have hereunto set my hand at Eau Claire, in the county of Eau Claire and State of Wisconsin.

ALFRED M. HAANSTAD.